United States Patent [19]
Wormley et al.

[11] Patent Number: 5,193,314
[45] Date of Patent: Mar. 16, 1993

[54] COMPUTER CONTROLLED GRINDING MACHINE FOR PRODUCING OBJECTS WITH COMPLEX SHAPES

[75] Inventors: David Wormley, Newton; Edward A. Agranat, Weston, both of Mass.

[73] Assignee: General Electric Company, Schenectady, N.Y.

[21] Appl. No.: 838,942

[22] Filed: Feb. 21, 1992

Related U.S. Application Data

[63] Continuation of Ser. No. 475,762, Feb. 6, 1990, abandoned.

[51] Int. Cl.⁵ .......................................... B24B 49/00
[52] U.S. Cl. ........................ 51/165.71; 51/165.77; 51/135 R; 51/145 R
[58] Field of Search ................ 51/95 R, 145 R, 48 R, 51/143, 50 R, 142, 144, 147, 165.71, 165.77, 165.78, 281 R, 328, 135 R

[56] References Cited
U.S. PATENT DOCUMENTS

| | | | |
|---|---|---|---|
| 4,031,809 | 6/1977 | Shraiman et al. | 409/132 X |
| 4,369,563 | 1/1983 | Williamson | 29/568 |
| 4,512,110 | 4/1985 | Stump | 51/165.79 X |
| 4,686,796 | 8/1987 | Giebmanns | 51/165.71 X |

*Primary Examiner*—M. Rachuba
*Attorney, Agent, or Firm*—Nixon & Vanderhye

[57] ABSTRACT

A grinding machine is particularly adapted to produce blades and buckets of the kind used in turbines and other objects having complex curved surfaces. Data blocks representing the surface of the object to be created are stored in a computer that controls the machine to finish a rough blank into the final object. An abrasive belt passes over a nose roller to make a line contact with the workpiece. The belt and the workpiece are subject to six computer-controlled degrees of freedom: three in translation and three in rotation. The supporting arm of the nose roller can be moved angularly about the belt contact point while the nose roller can be adjusted about a perpendicular axis through the contact point of the belt. Feedback controls indicate the position of and the motion velocity about the six axes. A positional feedback indicates the precise position of the workpiece at the finishing point to permit automatic compensation for belt wear.

17 Claims, 5 Drawing Sheets

COMPUTER CONTROLLED GRINDING MACHINE FOR PRODUCING OBJECTS WITH COMPLEX SHAPES

This is a continuation of application Ser. No. 07/475,762, filed Feb. 6, 1990, now abandoned.

BACKGROUND OF THE INVENTION

1. Field of the Invention

This invention relates to machine tools for shaping or finishing objects of complex shape to conform to a predetermined computer model. More particularly, it relates to a grinding machine having six axes under simultaneous computer control that permit simplified computer control programs and automatically produces objects of complex shapes rapidly and accurately. The described embodiment of the invention is particularly adapted to produce airfoil shaped blades and buckets, for example, of the kind used in turbines, and other objects having complex curved surfaces.

2. Description of Related Art

Objects of complex shape, such as turbine blades and buckets, are generally manufactured in several stages. In the first stage, a rough form is created by casting, forging, or milling by pantographic or numerically-controlled equipment. In the pantographic milling process, a cutter blade is controlled to follow the path of a tracing tool as it makes successive peripheral paths around a prototype. In a numerically-controlled milling process, a ball-end milling cutter is caused to follow a predetermined path to generate a near-final shape.

In milling processes, manufacturing economy dictates that the distance between adjacent passes around the periphery of the workpiece is relatively large. The workpiece surface, as it is generated by milling, is not smooth but consists of numerous nearly-parallel shallow grooves that correspond to the path of the cutting tool. The as-milled workpiece is not smooth enough or close enough to the required dimensions to have practical application. Cast or forged parts have inherently rough surfaces and coarse manufacturing tolerances, unless the parts are made by expensive precision casting processes, such as investment casting.

The cast or milled workpieces must be further refined in a second stage to smooth the surface and to bring it within permissible dimensional tolerances. There are several variations of these processes, but all are expensive and result in a significant rejection rate because of dimensions that are outside of acceptable tolerances. Automatic machining using computer controlled equipment has not been commercially practicable because of the complexity of the necessary programs to operate the finishing equipment using the current milling techniques.

U. S. Pat. No. 4,369,563 describes a computer-controlled machine system in which a number of separate numerically controlled machines perform successive machining operations on a workpiece that is moved automatically from one station to another.

U.S. Pat. No. 4,031,809 employs an end milling machine in which a plane end of a milling element is maintained approximately parallel with the plane of the surface being shaped. However when machining concave surfaces, such as those of turbine blades, the axis of the milling element is purposely skewed with respect to the local normal to avoid undercutting the surface. The milling device disclosed does not provide a smooth surface finish within the necessary tolerances for many applications.

SUMMARY OF THE INVENTION

In accordance with the present invention, the desired final shape of the workpiece is developed, typically, with the aid of a suitable CAD-CAM system. The resulting mathematically-defined workpiece surface is then post-processed to generate a series of six simultaneous sets of position and velocity commands. These commands are loaded into a numerical-control (N/C) computer which controls a grinding machine to finish a rough workpiece into a final object with dimensions and surface finish within preset tolerances.

In a computer controlled finishing machine, a roughly formed prototype of the object of complex shape to be finished is supported for rotation along a generally longitudinal support axis, the "stacking axis".

Finishing is done by an abrading tool, in this example incorporating an abrasive belt that passes over a cylindrical or barrel-shaped contact roller, preferably covered with, a layer of an elastomeric material such as polyurethane, to make a line contact with the workpiece. The abrasive belt and the workpiece are subject to six computer-controlled degrees of freedom: three in translation and three in rotation.

As used in the following description and in the claims: The "contact line" is the theoretical line of contact of the abrasive belt with the model to be duplicated that most closely conforms to the surface of the model. The center of the contact line is the "contact point". The "Z" axis is a displacement axis passing through the center of the contact line along which translation takes place to adjust the distance between the abrasion tool and the workpiece. The "Y" axis is a displacement axis parallel with the stacking axis in the direction of incremental or continuous movement of the workpiece in a plane perpendicular to the Z axis to permit successive peripheral passes of the abrasion tool around the workpiece. The "X" axis is a displacement axis perpendicular to the Y and Z axes. The "A" axis is a rotational axis about the X axis and passing through the contact point. The "B" axis is a rotational axis about the Y axis and passing through the workpiece, also called the "stacking axis", about which the workpiece is rotated during the finishing operation. The "C" axis is a rotational axis passing through the contact point perpendicular to the surface of the abrasive belt at the contact point The C axis can be parallel with the Z axis, but more often is offset from the Z axis by the "feed angle" The "feed angle" is the angle between the Z axis and the C axis about which the contact roller is angularly adjusted.

The contact line of the abrasive belt can be rotationally adjusted about the A and C axes to maintain the contact line parallel with the surface of the predetermined shape of the model at the point where the polishing operation is taking place.

The supporting arm of the contact roller is pivoted so that the C axis can be moved angularly about the contact point in the plane of the Y and Z axes. By this means the arm is manipulated so that the line about which the contact roller moves in its C axis is always congruent with a local normal of the predetermined shape at the corresponding point on the workpiece.

Positioning of the abrasive belt in the direction of the Z axis is accomplished by translational movement of either the abrasion tool or the workpiece. The workpiece being finished is also capable of translational movement along the stacking axis (the Y axis) to produce successive or continuous peripheral finishing passes.

Depending on the selection of the specific servomotors, feedback control mechanisms are provided to maintain optimum control of the finishing process. These include positional feedback to indicate the precise position of the contact roller and the workpiece being finished, and velocity feedback signals to denote the velocities of the workpiece and contact roller motions. These data are fed back to the NC control computer as error messages which are compared to the program data to control the position and velocities of the six control axes. The feedback signals also enable the computer to compensate for changes in the thickness of the abrasive belt to permit corrections for wear of the belt during the finishing process. Conventional numerical-control computer techniques are used, although the control must be quite fast with very short block-execution times for efficient and economical operation. These components and methods are well known and are not described in detail here.

The rotational axes A and C pass through the contact point. This geometry permits multiple abrasive-finishing passes to be done from a single part-description database, incrementing the workpiece and the abrasive belt toward each other along the Z axis. This geometry results in easy-to-write and understand software to facilitate part programming and allows belt-wear compensation to be performed by incrementing along the Z axis.

To provide the desired precision, all parts moving under computer control must be as light as possible to achieve a high frequency response and, at the same time, as stiff as possible to provide the required precision. These design criteria coupled with tuning the servoloops to high, stable gains to obtain high natural frequencies, permit unusually high speed of operation.

DESCRIPTION OF THE PREFERRED EMBODIMENT

A definition of the desired shape of the object to be formed can be structured by a number of different approaches. By the use of commercially available CAD/CA (Computer-Aided Design/ Computer-Aided Manufacturing) software, the surface of the model can be defined mathematically in terms of one or more continuous curved surfaces. Such CAD/CAM systems are available, for example, from A. S. Thomas, Inc., Norwood, Mass. under the trademark "NUFORM".

For purposes of illustration, the model can be defined by a series of sections in planes perpendicular to the "stacking axis" of the model. The term "stacking axis" is frequently used to describe a longitudinal line through the workpiece along which a series of profiles can be "stacked" to approximate a finished shape.

The number and spacing between adjacent sections needed for surface definition depend on the complexity of the object and whether or not local changes to the workpiece surface, such as raised bosses, must be present. In the most general case, a set of five sections is adequate to define a relatively complex object, such as a turbine blade. These sections would be taken at both ends, the middle, and at the one-quarter and three-quarter points along the stacking axis.

The profiles of each of the sections can be defined by many different means. One convention is to define the profile of a section by a set of coordinates, relative to the stacking axis, for each of a number of points on the perimeter. Another convention defines center point and radius coordinates for each arc of the profile.

Once the data which defines each section has been entered into the CAD/CAM computer, the surface is computed as one or more mathematically-defined entities, so that every point on the finished workpiece surface can be completely and accurately described. Note that state-of-the-art computer technology can be used to develop these mathematical surfaces directly from engineering data, without having to compute them from individual sections This does not, however, have an impact on this invention which uses the data to make a finished part, regardless of the means used to describe the part's surface.

After the mathematical surface definition has been completed, the data is post-processed to develop machine-specific commands to drive the six axes of motion required to finish the workpiece to final shape and surface quality. The post-processor software must be developed to account for rate of change of local surface curvature to determine how many passes around the workpiece will be needed. For surfaces whose curvature changes substantially along the "Y" axis (FIG. 5), a narrow abrasive belt 14 would be used, resulting in a large number of passes. Further, the computation of local curvature leads to determining the diameter of the contact roller 12, over which the belt 14 passes, and its longitudinal radius (radius which, when viewed from the side, makes the roller appear barrel-shaped). It is desirable to use the largest possible contact roller diameter, consistent with the final part shape, to minimize its speed and maximize the life of the contact roller bearings The post-processor software, commonly written for numerically-controlled machines by those skilled in the art, determines a number of points around the perimeter of the finished surface of the workpiece. The quantity of points is determined by the desired final accuracy of the surface, and the spacing between adjacent points is determined by the local rate-of-change of curvature of the surface. Typically, points in an area of rapid change are spaced close together, while points in an area of large radius can be spaced further apart. Conventional linear, circular, or parabolic interpolation routines can be used to provide smooth transitions between successive points.

For each point, a set of commands is generated for each of the six degrees of freedom of the grinding machine. This set of commands defines, for each point, the position of each axis and the instantaneous velocity of each axis. The velocity commands are used to maintain a constant surface speed of the workpiece relative to the abrasive tool. The surface speed is preprogrammed and is determined by such variables as abrasive quality, workpiece material composition, and required surface accuracy. The range of surface speeds commonly encountered is from fifty to two hundred inches per minute.

Figures 1, 2, 3, 4:
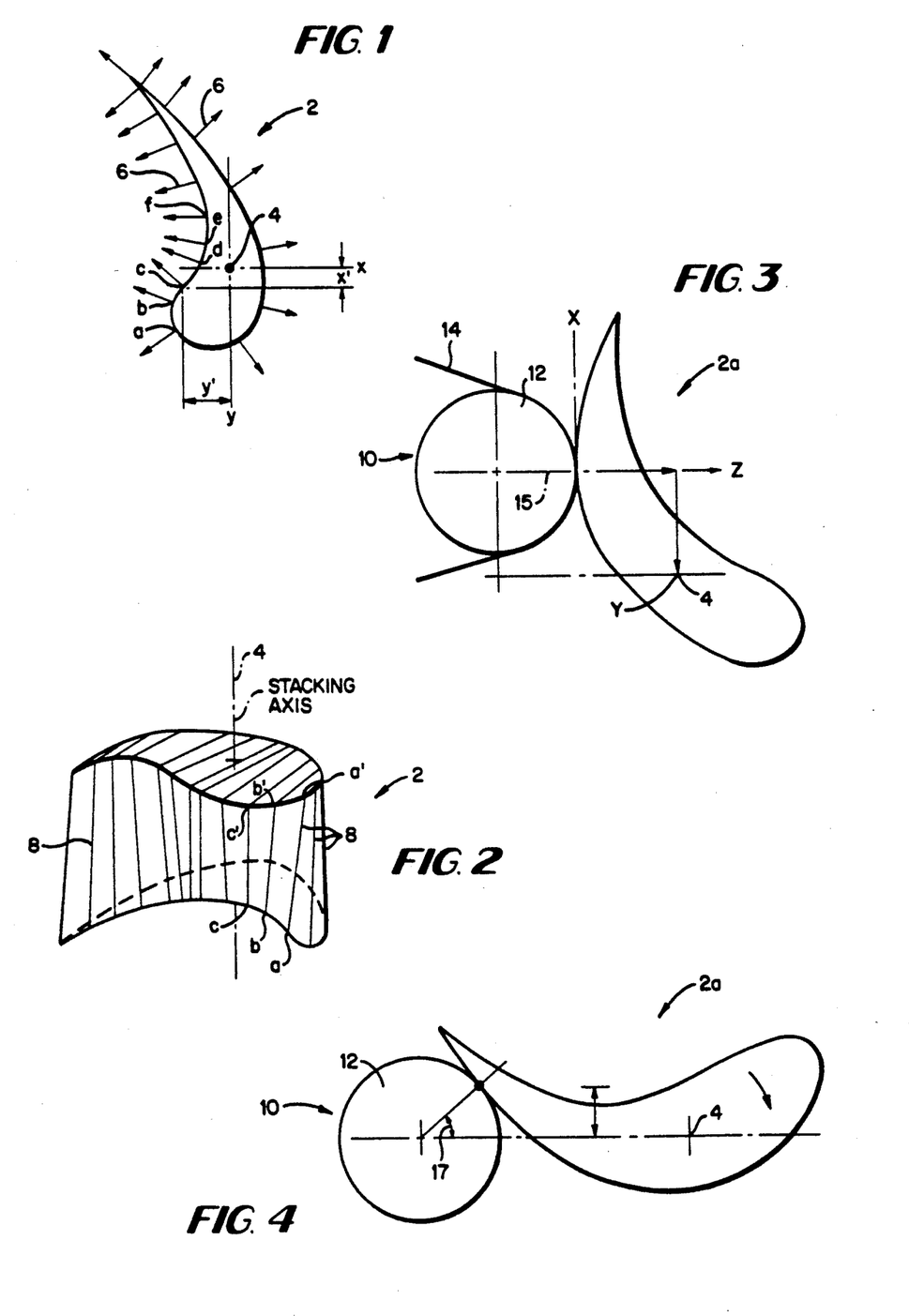
FIG. 1 is a cross section of a model of a typical turbine blade showing the local normals.
FIG. 2 is an illustrative perspective sketch showing two adjacent cross-sectional segments of a blade model and lines on the surface that correspond to successive positions of contact with the abrasive belt.
FIG. 3 illustrates diagrammatically the relationship between an abrasion tool and the surface of a section of a blade during the finishing process.
FIG. 4 illustrates the relationship between the abrasion tool or milling head and the workpiece in a conventional finishing operation.
Figure 5:
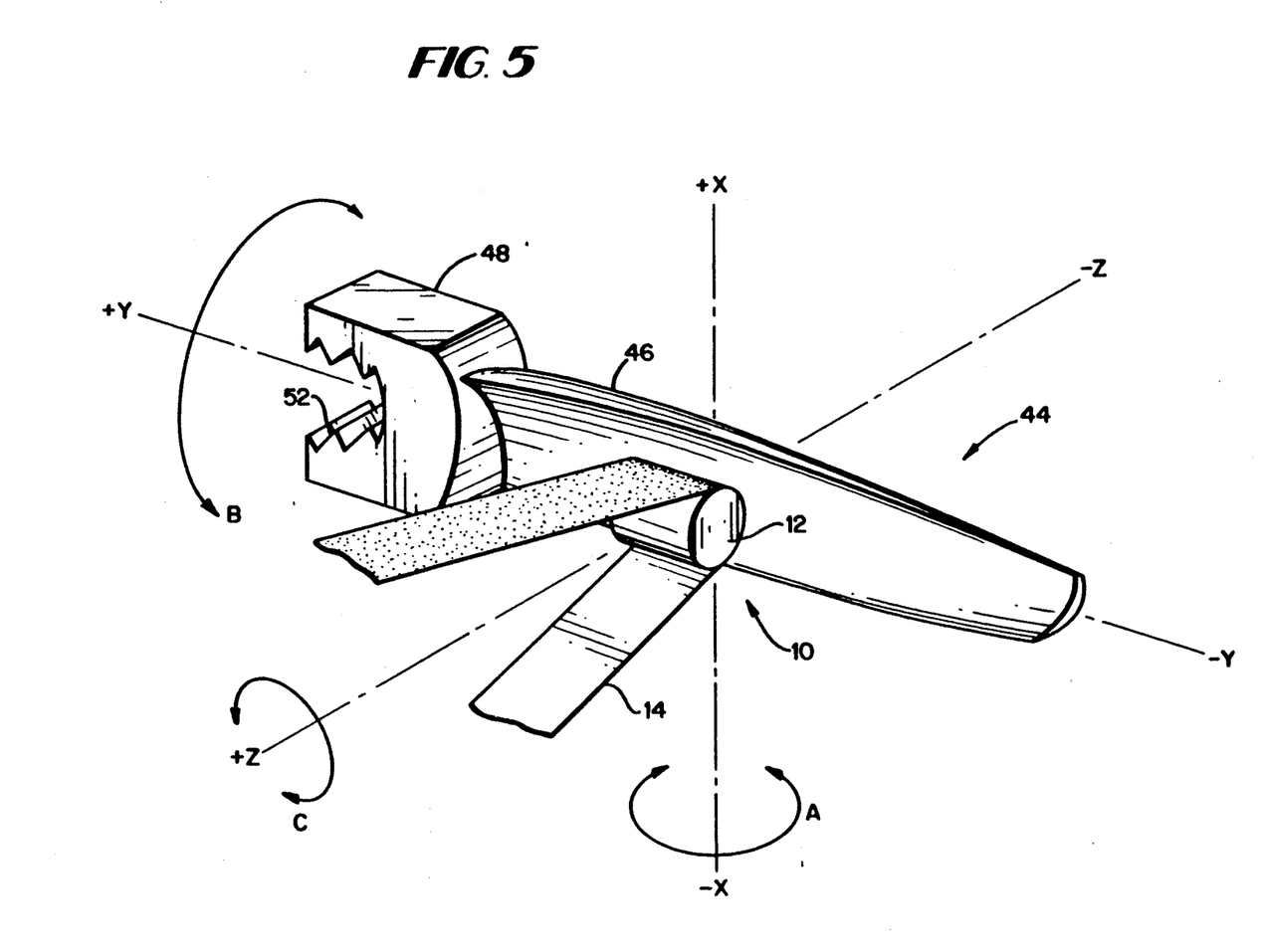
FIG. 5 illustrates the relationship between an abrasion tool and a finished turbine blade as positioned in the finishing machine shown in elevation in FIG. 6 and in plan view in FIG. 7.

FIG. 5 illustrates a workpiece, generally indicated at 44, including a blade portion 46 and a base 48. The base 48 includes a dovetail groove 52, typical of a turbine bucket, for securing the blade to a rotor or other support member (not shown). The workpiece is mounted by means of appropriate fixturing which is adapted to the base 48 and a support at the opposite end (not shown) and is rotated about the Y axis which corresponds to the stacking axis of the workpiece. The abrasion tool 10 is positioned along the C axis and is angularly rotatable about that axis so that the contact line between the abrasive belt 14 and the blade 46 is along a surface control line of the computer model.

The position commands are computed to keep the contact line, where the abrasive material contacts the workpiece, centered over each point and fitted closely with the workpiece surface, to maintain the center of rotation of the A and C axes at the specific point, and to assure that the center of the C axis is normal to the surface of the workpiece 44 at the contact point.

Maintaining the intersection of the A and C rotational axes at the contact point, and keeping the C axis center normal to the surface of the workpiece 44, permits incremental motion in a single axis, the Z axis, to compensate for wear of the abrasive material and to permit successive metal-removal passes over the surface of the workpiece.

The post-processed data is loaded into the grinding machine's N/C computer by any conventional method, e.g. punched tape, magnetic tape or disk, or downloaded from a host computer via a communications link. The rough workpiece is loaded into the machine by an operator or a robotic machine loader, and the N/C control system controls all subsequent process steps automatically.

The workpiece is caused to rotate about the B axis and to translate along the Y and X axes to an initial starting point The machine's A, B, and C axes are positioned just outside the point where contact would be made, and the belt drive motor 108 (FIG. 7) is started. A coolant pump (not shown) is actuated to provide a substantial flow of coolant directly to the contact point. The workpiece 44 rapidly rotates around the B axis and translates along the X axis while the abrasion tool 10 is simultaneously positioned in A, C and Z axes. At some point in this movement, the abrasive surface contacts the metal workpiece and metal removal is begun. After the first pass, which consists of one full rotation of the workpiece 44 around the B axis and continuous simultaneous coordinated movements of all the other axes, the abrasion tool 10 is fed closer to the workpiece by incrementing along the Z axis. The incremental feed distance depends on the quality of the abrasive material, the hardness of the workpiece and other factors, but is generally in the range of 0.015 to 0.020 inch.

This preprogrammed process continues, incrementing or continuously moving the workpiece along the Y-axis to provide an overlap between successive passes, until the workpiece surface has been ground to within about 0.003 to 0.005 inch from its desired final shape. The workpiece is then rotated and translated to a predetermined measurement position. A probe is actuated to determine the actual location of the surface at the measurement position. After the measurement has been recorded in the N/C control computer, the probe is retracted and the necessary incremental change is made in the Z-axis to permit a final pass during which the workpiece is ground to its final dimensions.

At the conclusion of the final pass, the machine's six axes are automatically repositioned to permit simple manual or robotic unloading of the finished workpiece, and loading of the subsequent rough workpiece.

The six degrees of freedom of motion during the abrasive machining operation are as follows: (1) The abrasion tool 10 or the workpiece 44 is translated along the Z axis. (2) The abrasion tool 10 is angularly rotated about the C axis to maintain the contact line between the abrasive belt 14 and the workpiece along a linear or nearly linear element of the desired surface of the workpiece. (3) The feed angle is adjusted to maintain the centerline of the C axis always coincident with the local normal of the model. (4) The workpiece 44 is rotated at a variable rate and direction about the Y axis such that the surface speed is held constant. (5) The workpiece is translated along the X axis. (6) The workpiece 2 is translated along the Y axis relative to the abrasion tool 10, in either fixed or variable increments or in a continuous feed.

To achieve maximum speed of operation, it will be apparent that certain of these motions must be made rapidly while others can be made at a relatively slow rate. The lengthwise motion of the position of the workpiece relative to the abrasion tool along the stacking axis and the angular change represented by the A axis may be relatively slow. It is feasible therefore that these motions can be made by sections of the grinding machine that have relatively high mass and sturdy construction. The workpiece rotation about the Y axis, the translation in the X and Z axes, and the rotation about the C axis can be quite rapid, dictating that the structures involved must be of minimum mass consistent with the necessary stiffness to provide the required precision.

A numerical control computer system of conventional design includes a memory in which the desired axis position and velocity commands specific to the workpiece are stored. A numerical control program provides six sets of simultaneous control signals to produce the linear and angular displacements necessary to finish the workpiece to the required tolerances. The axis commands stored in the computer memory need represent only the final desired shape of the workpiece. This shape is reached by a series of successive machining operations in which the abrasion tool is moved progressively nearer the stacking axis 4 of the workpiece by incremental movements along the Z axis.

Figure 6:
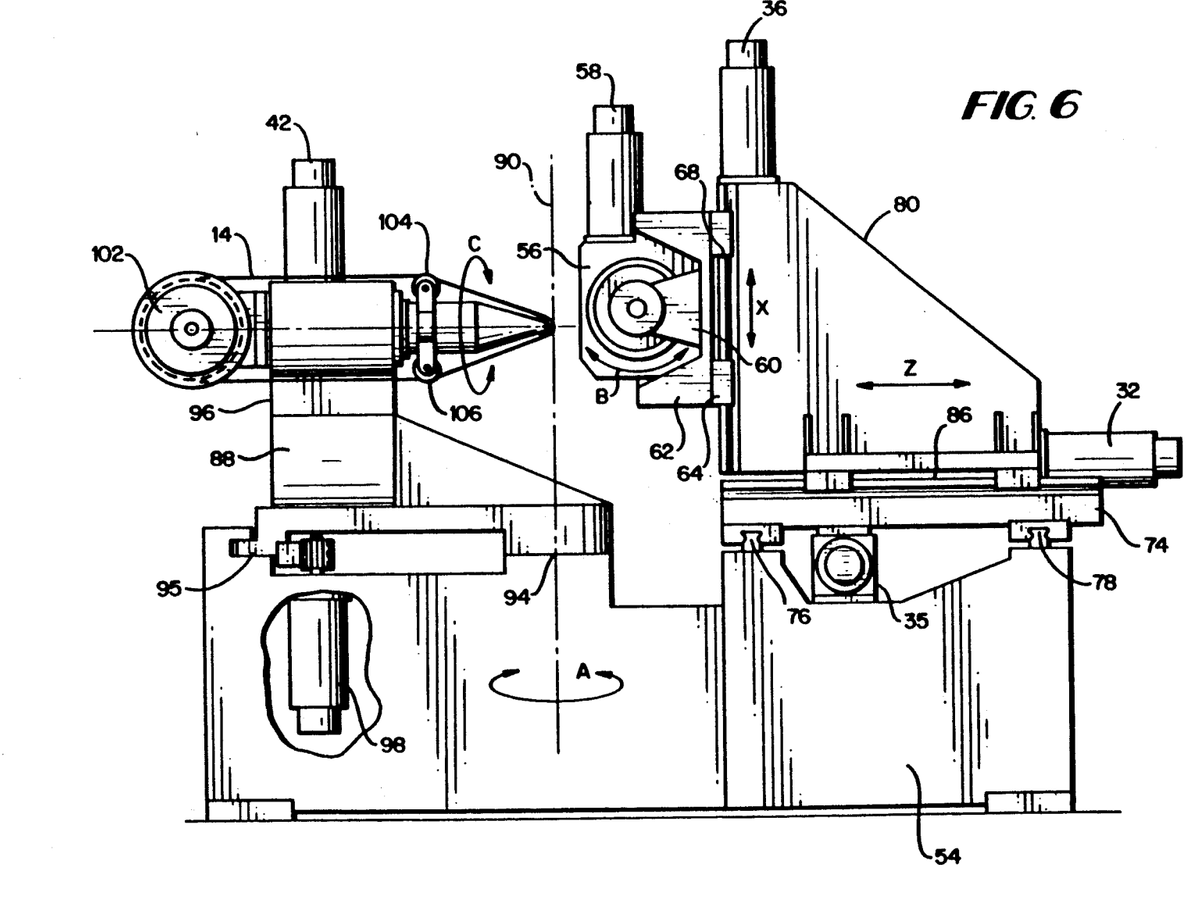
Figure 7:
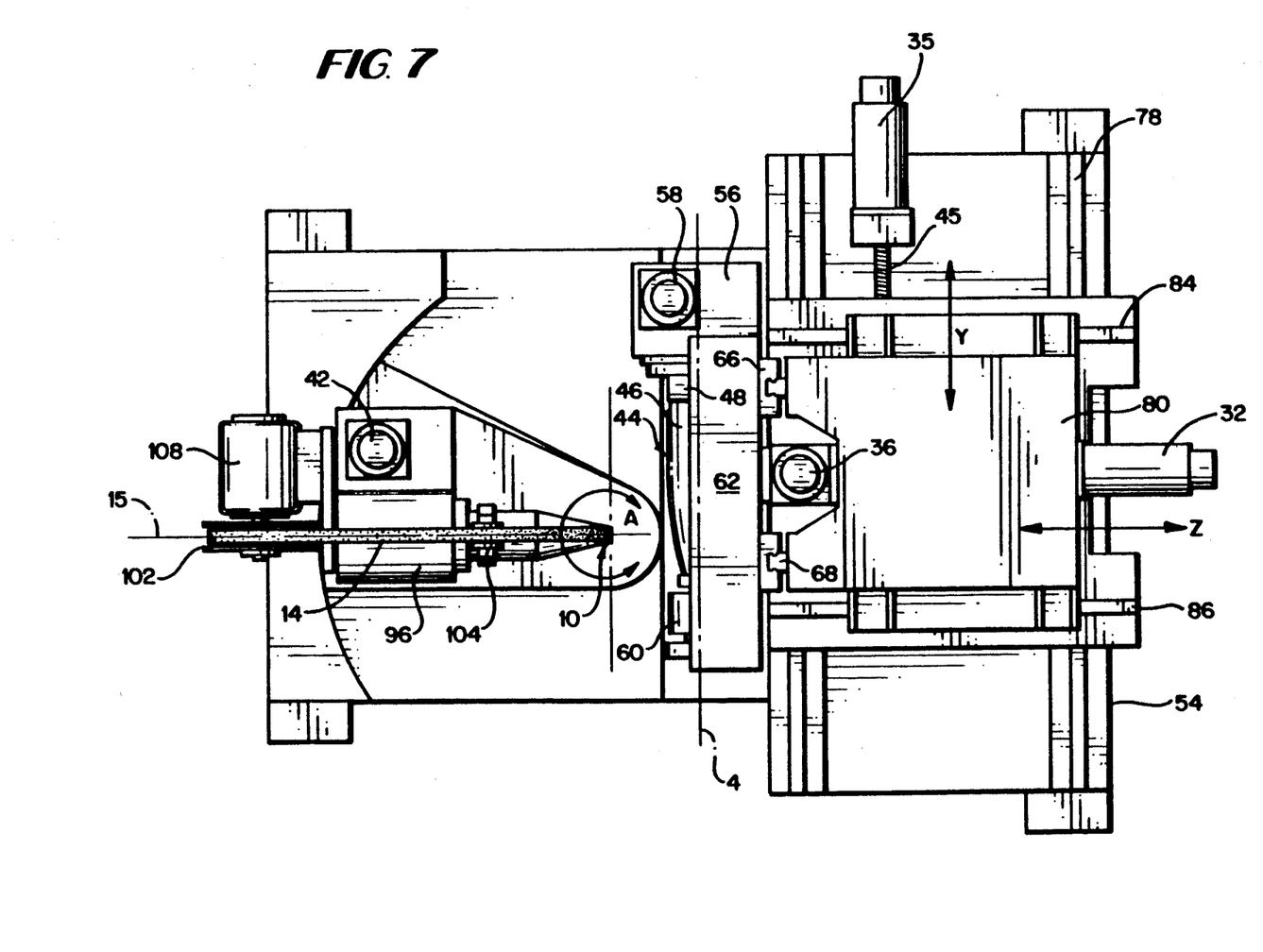
Figure 8:
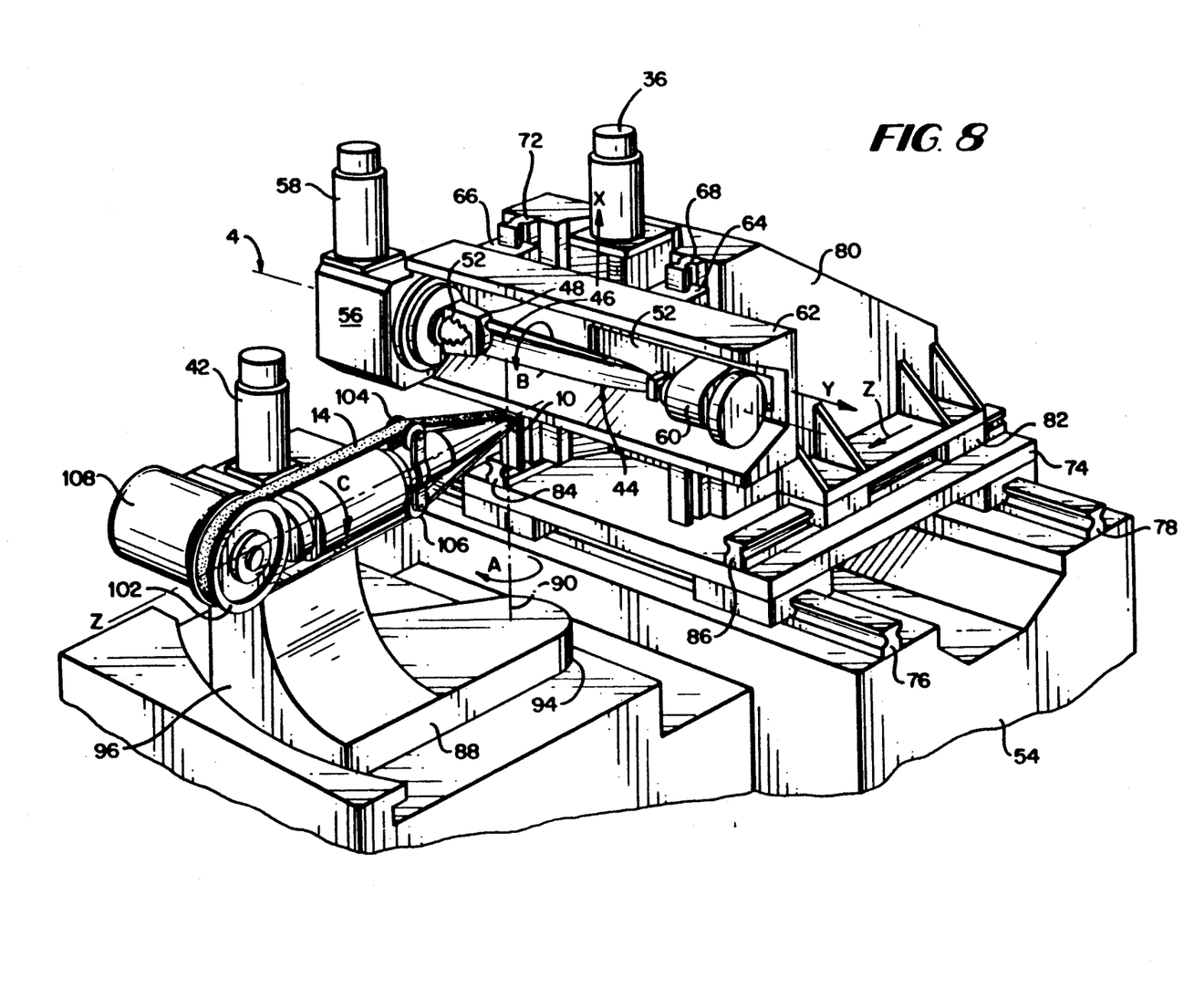
FIG. 8 is a diagrammatic perspective view of a portion of a finishing machine embodying the invention.

Details of the operation of the control circuits are not described in detail here as they are already well known to those skilled in these arts. As shown in FIGS. 6 and 7, the grinding machine includes a base, generally indicated at 54, that supports both the workpiece manipulating machinery and the actuating mechanism for the abrasion tool. As shown in FIG. 8, the base 48 of the rough blade blank 46 of the workpiece, is secured by means of fixturing (not shown) which locates on the dovetail groove 52 to a rotary table 56 that is driven by a workpiece drive motor 58. The opposite end of the workpiece 46 is supported by an adjustable tail piece, generally indicated at 60. The motor 58 is under computer control and the rotary position of the workpiece is continually fed back to the computer system.

The workpiece 44 and its drive mechanism are mounted in an X-axis table, generally indicated at 62, that is secured to a pair of vertical guides 64 and 66. These guides are in turn slidably mounted, for vertical movement, on a pair of guide rails 68 and 72 mounted on a Y-axis table 74. By this means the entire X-axis table and its rotary drive are movable in translation vertically along the X axis. The X-axis table 62 is driven by a servo motor 36 using a conventional drive means (not shown), such as a lead screw, to provide the X-axis translation of the blade assembly under control of the computer program.

To provide translation movement horizontally along the Y axis, a Y-axis table 74 is supported on a pair of horizontal guide rails 76 and 78 that support the Z-axis table 80 to permit the blade drive assembly to be translated along a path parallel with the stacking axis. This translation is also provided, under the control of the computer program, by any known mechanism such as a lead screw 45, shown here as the y-axis translation means.

To permit movement toward and away from the abrasion tool 10, the Z-axis table 80 is supported by a pair of guides 82 that are slidably mounted on a pair of rails 84 and 86. Movement along the Y axis is incremented for the successive passes of the abrasion tool 10. Three separate servo motors, 32, 35, and 36 provide the driving forces to provide the three translational movements of the workpiece: along the Y axis parallel with the stacking axis (35); along the vertical axis X (36); and along the horizontal axis Z (32).

The mechanism thus far described provides for the rotary movement of the blade 46, and its translational movement along the X and Y and Z axes. To control the abrasion tool 10, the abrasive belt 14 and its drive mechanism are mounted on an extension of the machine base 54. For purposes of illustration, the distance between the workpiece 46 and the abrasion tool 10 is exaggerated. In the actual machine, the abrasion tool 10 is positioned so that the workpiece can be moved along the Z axis to bring it in contact with the abrasive belt 14. A swing arm, generally indicated at 88, is supported by a largearea bearing 95 and pivoted on the machine base 54 about a central bearing 94 whose A axis, indicated at 90, is parallel with the X axis of the workpiece drive and passes through the contact point of the abrasion tool 10. A conventional servo motor 98 is housed within the base and rotates the swing arm 88 about the A axis.

An upright arm 96 supports the abrasive belt machine assembly. This assembly consists of a belt drive motor 108 that operates a drive wheel 102. The abrasive belt 14 passes over the drive wheel 102 and spreader rollers 104 and 106 positioned on opposite sides of the contact roller 12. This entire assembly including the belt drive motor 108, drive wheel 102, abrasive belt 14, spreader rollers 104 and 106 and the contact roller 12 is rotatable about the C axis under control of the computer 28. A conventional servo motor and drive assembly 42 provide the computer-controlled rotation of the abrasion tool assembly about the C-axis. Automated tension control means (not shown) allow slack for changing belts and maintaining a predetermined tension on the abrasive belt 14 during operation.

In operation, the Z-axis table 80, the Y-axis table 74 and the X-axis table 62 are displaced along their respective guide rails until the intersection of the A and C axes contacts the workpiece 46 at a predetermined radial point along the workpiece. The arm 96 of the abrasion tool assembly is rotated about the C axis to align the contact line between the abrasive belt 14 and the workpiece 46 along the surface of the model at the contact point as directed by the specific part data stored in the computer.

The Y-axis table is retained in one position while the workpiece is rotated about the stacking axis. During the rotation, the translations of the Z-axis table 80 and the X-axis table 62, and rotations of the abrasion tool 10 about the C axis and the arm 88 about the A axis, are performed as necessary to maintain the contact line along the surface corresponding to the model at that point. These translations and rotations take place continuously, simultaneously and rapidly as the workpiece 46 is rotated. At the end of one or more rotations of the workpiece, the Y-axis table is indexed a predetermined amount, for example, a distance equal to about 0.5 to 0.8 times the width of the abrasive belt 14. The indexing distance need not be the same for all parts of the workpiece but may be adjusted in accordance with the surface curvatures of the model under the control of the computer. The successive passes are continued until the workpiece falls within the allowable tolerances of the computer model. Motion along the Y axis can also be continuous, generating a helical path around the workpiece.

During the finishing process, the belt 14 wears and becomes thinner. If this change in thickness is not compensated, a corresponding dimensional error in the finished workpiece will result. To provide this compensation, the positions of reference points on the workpiece are intermittently monitored by a conventional electronic probe (not shown). This information is fed back to the computer, and compared with the expected positions of the reference points. Since the precise position of the contact roller is known, the computer program is able to compute the thickness of the belt 14 and make the corresponding adjustment in the position of the contact roller 12 along the C axis so that the final dimensions of the workpiece correspond precisely to the data which represent the final desired shape of the workpiece.

On each successive pass, all of the motions in the X, Y, and Z axes and rotations about the A, B and C axes are identical except that the Z-axis table is initially offset slightly with the offset decreasing to zero on the final pass. The initial offset is generally slightly greater than the total thickness of material to be removed from the rough workpiece. Thus, only a single set of positional data points must be followed to control all displacements.

We claim:

1. The method of finishing a workpiece to correspond to a predetermined complex shape comprising the steps of providing a control computer having stored therein data representing the surface of a model of the object to be created, positioning said workpiece for rotation about a stacking axis of said model, positioning an abrasion tool having an abrasive belt to engage the surface of said workpiece along a linear contact line, supporting said abrasion tool on a C axis passing through a fixed point on said contact line for relative movement between said abrasion tool and said workpiece along a Z axis extending perpendicular to said stacking axis, angularly adjusting said abrasion tool about said C axis to maintain said contact line along a surface of said model, angularly adjusting said C axis about an X axis perpendicular to said C axis and passing through said contact line to maintain said C axis in a plane perpendicular to the plane of a local normal of said model and passing through said contact line, adjusting the translational position of said abrasion tool relative to said workpiece along said Z axis, continually and automatically determining the position of the surface of said workpiece along said C axis, continually and automatically determining the position of said belt at the point where said belt makes contact with said workpiece, thereby to determine the thickness of said belt, and continually and automatically readjusting the translational position of said abrasion tool relative to said workpiece to compensate for changes in the thickness of said belt caused by wear during the finishing process.

2. The method as claimed in claim 1 including the additional step of translating said workpiece along an axis parallel with the stacking axis, and wherein said workpiece is independently translated along said Z axis.

3. The method as claimed in claim 2 wherein said workpiece is adjusted along said Z axis in successive predetermined incremental steps.

4. The method for machining a workpiece to conform with a model of predetermined shape comprising the steps of providing a computer control means having stored therein blocks of data tables representing said predetermined shape, rotating said workpiece about a Y axis therethrough, providing an abrasive machining tool including an abrasive belt having a generally cylindrical moving surface, mounting said abrasive machine tool for angular adjustment about a C axis and translational movement along a Z axis perpendicular to said Y axis, adjusting said abrasive machine tool along said Z axis to engage the surface of said workpiece at a contact point, and angularly adjusting the rotational position of said abrasive machine tool about said C axis and said C axis about said contact point thereby to position said abrasive machine tool to engage said workpiece along a linear contact line corresponding to the surface of said predetermined shape, continually and automatically determining the position of the surface of said workpiece along said C axis, continually and automatically determining the position of said abrasive belt at the point where said belt makes contact with said workpiece, thereby to determine the thickness of said belt, and continually and automatically readjusting the translational position of said abrasive belt relative to said workpiece to compensate for changes in the thickness of said belt caused by wear during the finishing process.

5. A grinding machine for finishing a workpiece to correspond to a model having a predetermined complex shape comprising means for supporting said workpiece and rotating it about a Y axis, an abrasion tool having an abrasive belt positioned to engage the surface of said workpiece along a linear contact line, support means for supporting said abrasion tool, first control means for producing relative translational movement between said abrasion tool and said workpiece along a Z axis extending perpendicular to said Y axis, means for angularly adjusting said support means about an X axis perpendicular to said Z axis and passing through a fixed point on said contact line, drive means for angularly adjusting said support means about a C axis parallel with the plane of the Y and Z axes and extending through said point to position said contact line along a surface of said predetermined shape, second control means for angularly adjusting said C axis about a fixed point on said contact line to maintain said C axis in a plane parallel with a local normal and passing through said fixed point, continually and automatically determining the position of the surface of said workpiece along said C axis, continually and automatically determining the position of said belt at the point where said belt makes contact with said workpiece, thereby to determine the thickness of said belt, and continually and automatically readjusting the translational position of said abrasion tool relative to said workpiece to compensate for changes in the thickness of said belt caused by wear during the finishing process.

6. The combination as claimed in claim 5 wherein said first control means includes a first table, a second table mounted on said first table; and a third table mounted on said second table and supporting said workpiece, whereby said workpiece may be translated along said X, Y and Z axes.

7. The combination as claimed in claim 5 including a first table, a second table mounted on said first table, a third table mounted on said second table; and first second and third means for displacing said first, second and third tables respectively in first, second and third orthogonal directions, and wherein said means for supporting said workpiece includes means for affixing said workpiece to said third table.

8. Machining apparatus for automatically machining a workpiece to conform with a predetermined shape, comprising a machine base, a Z-axis table mounted no said machine base, first displacement means for displacing said Z-axis table along a Z axis with respect to said machine base, a Y-axis table mounted on said Y-axis table;

second displacement means for displacing said Y-axis table along a Y axis with respect to said Z-axis table, said Y axis being orthogonal to said Z axis, an X-axis table mounted on said Y-axis table, third displacement means for displacing said X-axis table along an X axis with respect to said Y-axis table, said X axis being orthogonal to said Y and Z axes, means on said X-axis table for rotating said workpiece about said Y axis, an abrasive belt machine assembly including
  a belt drive motor, and
  a drive wheel and nose roller for supporting and rotating an abrasive belt, means controlling said assembly to move said abrasive belt into engagement with said workpiece along a linear contact line, first contact line control means for rotating said abrasive belt and nose roller about a C axis parallel with the plane of said Y and Z axes and passing through a fixed point on said linear contact line, second contact line control means for rotating said abrasive belt and nose roller about an A axis parallel with said X axis and passing through said fixed point, whereby said first and second contact line control means are effective for rotating said linear contact line while said fixed point remains stationary, a control system under computer control including
  means for (a) displacing said workpiece along said Y and Z axes, (b) angularly adjusting said C axis about said A axis to maintain said linear contact line nearest the surface of said predetermined shape at the finishing point, and (c) angularly adjusting said assembly about said fixed point to maintain said linear contact line perpendicular to a local normal of said predetermined shape at the point of finishing as said workpiece is rotated about said Y axis,
  continually and automatically determining the position of the surface of said workpiece along said C axis,
  continually and automatically determining the position of said belt at the point where said belt makes contact with said workpiece, thereby to determine the thickness of said belt, and
  continually and automatically readjusting the translational position of said abrasion tool relative to said workpiece to compensate for change in the thickness of said belt caused by wear during the finishing process.

9. Apparatus for machining a workpiece to conform to the shape of a mathematical model comprising
a machine base,
a Z-axis table mounted on said machine base,
first displacement means for displacing said Z-axis table along a Z axis with respect to said machine base,
a Y-axis table mounted on said Z-axis table,
second displacement means for displacing said Y-axis table along a Y axis perpendicular to said Z axis,
an X-axis table mounted on said Y-axis table,
third displacement means for displacing said X-axis table along an X axis perpendicular to said first and second displacement axes,
drive means on said X-axis table for rotating said workpiece about a Y axis passing through said workpiece, an abrasive-belt machine assembly including
  a drive wheel,
  a nose roller,
  an abrasive belt positioned over said drive wheel and said nose roller, and
  a drive motor for driving said drive wheel,
  said abrasive belt being movable to engage said workpiece along a linear contact line extending across said belt, first contact line control means for angularly adjusting said abrasive belt and said nose roller about a C axis in a plane parallel with the plane of said Y and Z axes and extending through a fixed point on said linear contact line, second contact line control means for angularly adjusting said abrasive belt and nose roller about an A axis parallel with said X axis and passing through said fixed point, whereby said control means are effective for angular adjustment of said abrasive belt while said fixed point remains stationary, a control system including means for displacing said workpiece along said X, Y and Z axes while angularly adjusting said linear contact line about said fixed point to maintain said contact line along the surface of said predetermined shape at the point of finishing, continually and automatically determining the position of the surface of said workpiece along said C axis, continually and automatically determining the position of said belt at the point where said belt makes contact with said workpiece, thereby to determine the thickness of said belt, and continually and automatically readjusting the translational position of said abrasion tool relative to said workpiece to compensate for changes in the thickness of said belt caused by wear during the finishing process.

10. A grinding machine for grinding a complexly curved workpiece comprising in combination:
an abrasive belt assembly for supporting an abrasive belt, said belt assembly having a longitudinal axis through its center and a nose supporting belt to define a contact point, said belt assembly having means to rotate said nose about said longitudinal axis and means to maintain said longitudinal axis normal to said workpiece at said contact point during grinding operations;
means for rotatably supporting said workpiece and for moving said workpiece and said belt assembly relative to one another to engage said belt and said workpiece at said contact point; and
computer-controlled means for coordinating said belt assembly and said workpiece so as to grind multiple instantaneous linear contact lines on the surface of said workpiece.

11. A grinding machine for grinding a complexly curved workpiece comprising in combination:
a horizontally-oriented belt assembly for supporting an abrasive belt, said belt assembly having a longitudinal axis through its center and a nose supporting said belt at a workpiece contact point, said belt assembly having means to maintain said longitudinal axis normal to said workpiece at said workpiece contact point during abrasive grinding operations;
means for rotatably supporting said workpiece and for horizontally moving said workpiece and said belt assembly relative to one another to engage said belt and said workpiece at said workpiece contact point; and computer-controlled means for coordinating said belt assembly and said workpiece so as to grind multiple instantaneous linear control lines on the surface of said workpiece, the length of each of said linear contact lines being determined by the radius of curvature of said workpiece surface at said contact point and the predetermined finish tolerance of the dimensions of said workpiece.

12. A grinding machine for grinding a complexly curved workpiece comprising in combination:

a horizontally-oriented belt assembly for supporting an abrasive belt, said belt assembly having a nose supporting said belt at a contact point, and aid belt assembly having means to rotate said nose;

means for rotatably supporting said workpiece and for horizontally moving one of the belt assembly and workpiece relative to the other to make contact between said belt and said workpiece at said contact point;

support means for said belt assembly, said support means being pivotable so as to ensure that said nose is normal to the surface of said workpiece at the contact point; and computer-controlled means for coordinating the relative motion of said workpiece and said belt assembly nose at said contact point, said means utilizing said contact point as the reference point for calculating instantaneous linear contact lines on the surface of said workpiece to be traced by said contact point, the length of each of said linear contact lines being dependent upon the radius of curvature of said workpiece in the area of said lines and the desired finish tolerance of the workpiece, said linear contact lines lengths being calculated by employing point-to-point methodology.

13. A grinding machine according to claim 10, further comprising:

feedback means for verifying the relative positions of said belt assembly nose and said workpiece so as to provide means for compensating for the wear of said abrasive belt.

14. For use with a grinding machine for grinding surfaces of a complexly curved workpiece, a belt assembly for supporting an endless abrasive belt and transporting said belt to a workpiece so as to make contact between said belt and said workpiece at a contact point, said belt assembly having a longitudinal axis through its center and a nose supporting said belt at said contact point, said belt assembly having means to rotate said nose about said longitudinal axis and means to maintain said longitudinal axis normal to said workpiece at said contact point during grinding operations.

15. A belt assembly according to claim 14 wherein said contact between said belt and said workpiece is a line contact centered about said contact point.

16. A belt assembly according to claim 15 wherein the length and thickness of said line is determined by the effective diameter and profile of said assembly nose.

17. A method for controlling a grinding machine and a complexly curved workpiece during grinding operations, aid method comprising the following steps:

(1) rotatably supporting said complexly curved workpiece;

(2) horizontally relatively moving an abrasive belt into contact with said workpiece at a contact point so as to maintain said belt normal to the surface of said workpiece at said contact point during grinding operations;

(3) grinding multiple instantaneous linear contact lines on the surface of said workpiece, the length of each of said linear contact lines being determined by the radius of curvature of said workpiece surface at said contact point and the predetermined finish tolerance of the dimensions of said workpiece.

* * * * *